(12) United States Patent
Vail et al.

(10) Patent No.: US 9,090,742 B2
(45) Date of Patent: Jul. 28, 2015

(54) FACILE SYNTHESIS OF METALLOPORPHYRIN POLYMERS

(71) Applicant: Sharp Laboratories of America, Inc., Camas, WA (US)

(72) Inventors: Sean Vail, Vancouver, WA (US); David Evans, Beaverton, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 76 days.

(21) Appl. No.: 13/930,120

(22) Filed: Jun. 28, 2013

(65) Prior Publication Data

US 2015/0005463 A1 Jan. 1, 2015

(51) Int. Cl.
*C08G 79/00* (2006.01)
*C08G 61/12* (2006.01)

(52) U.S. Cl.
CPC ...................... *C08G 79/00* (2013.01)

(58) Field of Classification Search
CPC ..................................................... C08G 79/00
USPC ........................... 526/241; 540/145; 528/243
See application file for complete search history.

(56) References Cited

U.S. PATENT DOCUMENTS

| 5,986,090 | A | 11/1999 | Therien et al. |
| 7,022,840 | B2 | 4/2006 | Kobuke et al. |
| 2009/0023842 | A1 | 1/2009 | Laird et al. |
| 2010/0065123 | A1 | 3/2010 | Gust, Jr. et al. |

FOREIGN PATENT DOCUMENTS

WO  WO2005/106965  11/2005

OTHER PUBLICATIONS

V. S-Y. Lin, S. G. DiMagno and M. J. Therien, "Highly Conjugated, Acetylenyl Bridged Porphyrins: New Models for Light-Harvesting Antenna Systems", Science 1994, 264, 1105-1111.
R. Wagner et al., "Synthesis of Ethyne-Linked or Butadiyne-Linked Porphyrin Arrays Using Mild, Copper-Free, Pd-Mediated Coupling Reactios", J. Org. Chem. 1995, 60, 5266-5273.
H. Chen, J. Zeng, F. Deng, X. Luo, Z. Lei and H. Li, "Synthesis and Photophysical Properties of Porphyrin-Containing Polymers", Journal of Polymer Research 2012, 19:9880.
K. Jyothish et al., "Highly Active Multidentate Alkyne Metathesis Catalysts: Ligand-Activity Relationship . . . ", Advanced Synthesis & Catalysis 2012, 354, 2073-2078.
N. Xiang et al., "Synthesis and Characterization of Porphyrin-Terthiophene and Oligothiophene π-Conjugated . . . ", European Polymer Journal 2010, 46, 1084-1092.
S. Shi et al., "Porphyrin-Containing D-π-A Conjugated Polymer with Absorption Over the Entire Spectrum of Visible Light . . . ", Journal of Materials Chemistry 2012, 22, 11008.
Natori et al., "Synthesis of Porphyrin-End-Functionalized Poly(p-phenylene) as a Leaf-Green-Colored Soluble . . . ", Reactive and Functional Polymers 2013, 73, 200-206.
A-L. Wirotius et al., "Hydrosoluble Dendritic Poly(ethylene oxide)s with Zinc Tetraphenylporphyrin Branching Points as Photosensitizers", Polymer Chemistry 2013, 4, 1903-1912.
L. Ruhlmann et al., "A Polycationic Zinc—5,15-Dichlorooctaethylporphyrinate-Viologen Wire", Journal of the American Chemical Society 1999, 121, 6664-6667.
J. Hao et al., "Supramolecular Assemblies Obtained by Large Counteranion Incorporation in a Well-Oriented Polycationic Copolymer", Langmuir 2008, 24, 1600-1603.
A. Giraudeau, et al., "A Simple Way for the Electropolymerization of Porphyrins", Journal of Electroanalytical Chemistry 2010, 638, 70-75.
P. A. Liddell et al., A. E. Keirstead, S. Lin; T. A. Moore, A. L. Moore and D. Gust, "Porphyrin-Based Hole Conducting Polymer", Chemistry of Materials 2008, 20, 135-142.
U. Michelsen and C. A. Hunter, "Self-Assembled Porphyrin Polymers", Angewandte Chemie International Edition 2000, 39, 764-767.
Z. Wang, S. Yuan, A. Mason, B. Reprogle, D-J. Liu and L. Yu, "Nanoporous Porphyrin Polymers for Gas Storage and Separation", Macromolecules 2012, 45, 7413-7419.
A. Modak et al., "Porphyrin Based Porous Organic Polymers: Novel Synthetic Strategy and Exceptionally High CO2 Adsorption Capacity", Chemical Communications 2012, 48, 248-250.
A. M. Shultz et al., "Synthesis of Catalytically Active Porous Organic Polymers from Metalloporphyrin Building Blocks", Chemical Science 2011, 2, 686-689.

*Primary Examiner* — Duc Truong
(74) *Attorney, Agent, or Firm* — Law Office of Gerald Maliszewski; Gerald Maliszewski (57) ABSTRACT

A method is provided for synthesizing a metal (M) meso-tetraphenylporphyrin polymer. The method begins with the provision of a free-base ($H_2$)-meso-tetra-4-(trialkylsilyl) ethynylphenylporphyrin ($H_2$-tetra-C≡C-TriAS-TPP) including a trialkylsilyl (TriAS) moiety attached to an ethynyl termini. In response to a reaction with a metal (M)-containing material, the $H_2$-tetra-C≡C-TriAS-TPP is converted to a metal (M)-tetra-4-(trialkylsilyl)ethynylphenylporphyrin (M-tetra-C≡C-TriAS-TPP). Then, the M-tetra-C≡C-TriAS-TPP is converted to a M-tetra-4-ethynylphenylporphyrin (M-tetra-C≡C-TPP) monomer by removing the trialkylsilyl (TriAS) moiety from the ethynyl termini. Finally, a plurality of M-tetra-C≡C-TPP monomers are coupled together to supply a metal (M)-meso-tetraphenylporphyrin polymer (M-poly-meso-TPP), whereby meso-phenyl groups of adjacent M-tetra-C≡C-TPP monomers in the M-poly-meso-TPP are connected through a butadiyne linking moiety. In one aspect, the metal is zinc.

10 Claims, 9 Drawing Sheets

FACILE SYNTHESIS OF METALLOPORPHYRIN POLYMERS

BACKGROUND OF THE INVENTION

1. Field of the Invention

This invention generally relates to light harvesting porphyrin polymer materials and, more particularly, to a metal (M)-meso-tetraphenylporphyrin polymer (M-poly-meso-TPP) and associated synthesis method.

2. Description of the Related Art

Although chlorophyll, chlorophyll derivatives, and synthetic porphyrins have diverse molecular structures, they exhibit characteristic optical properties over comparable wavelength ranges (typically $\lambda=350$ to 700 nm in many cases). Synthetic porphyrins (and corresponding metalloporphyrins) consist of a conjugated $22\pi$ electron system, 18 of which are effectively delocalized to fit the Hückel requirement for aromaticity. In addition to their structural resemblance to natural chromophores such as chlorophyll, synthetic porphyrins are attractive candidates as light-harvesting materials due to their high structural stability, robust light absorption capabilities, and synthetic accessibility, as compared to more complex, naturally occurring chromophores. Photo-excited processes involving porphyrins are facilitated by the highly delocalized n-system, which is capable of resisting major structural changes upon oxidation. Most importantly, the redox properties of porphyrins and metalloporphyrins are dramatically altered upon photo-excitation, which leads to the generation of porphyrin excited states that can be exploited in photovoltaic (PV) applications.

The ability of porphyrins to efficiently harvest light over broad wavelength ranges has generated significant interest in their potential in solar energy applications over the last few decades. As a result, synthetic protocols towards the fabrication of "customized" porphyrin architectures have become well-established and have been widely adopted as conventional methods. In general, the electronic properties of porphyrins can be altered using a number of strategies including some of the following: functionalization and/or modification along the porphyrin periphery, insertion of transition metals into the macrocyclic core, and coordination of metalloporphyrins with various ligands.

Although many alternatives have evolved, there exist two major fundamental synthetic strategies for constructing the core porphyrin macrocycle, which are described independently below.

In the first scenario (Method A), an aromatic aldehyde (for example, benzaldehyde in the case of tetraphenylporphyrin) or mixture of chemically functionalized aromatic aldehydes is reacted with pyrrole (or chemically functionalized pyrroles) using an acid catalyzed condensation reaction performed in organic acid (acetic acid or propionic acid, for example) at elevated temperatures. Since the distribution of chemical reaction products (porphyrins) consists of a statistical mixture representing all possible combinations at different ratios, in addition to polymeric and oligomeric products, the usefulness is ordinarily limited to symmetrical tetraphenylporphyrins. In addition, the sensitivity of the starting materials to the rather harsh reaction conditions (high temperature in acidic media) necessarily places limitations on the nature of reactants that can be utilized. Assuming the target porphyrin is an unsymmetrical tetraphenylporphyrin, subsequent purification is almost always a requirement. In almost every case, the necessary purification involves chromatographic separation of a complex mixture of porphyrin materials. Although overall reaction yields using this strategy are typically only modest, starting materials are often commercially available.

As used herein, chromatography refers to a purification method that involves separating/isolating individual compounds from a mixture of compounds. The most common chromatography technique is column chromatography whereby a vertical (usually glass) column is packed with a stationary phase (usually silica gel or alumina) that functions as an adsorbent material. Typically, a material or mixture of materials (dissolved in a solvent) is placed onto the top of the stationary phase in the column and is allowed to proceed down the column by addition of a mobile phase (commonly referred to as eluent). The column chromatography process may be performed by relying on gravity (or percolation) to flow the mobile phase down the column or by applying a positive pressure in a technique commonly referred to as "flash" chromatography. During the chromatography process, an equilibrium is established between the solute (which refers to the materials/compounds to be separated) adsorbed on the stationary phase and the mobile phase flowing down the column. Owing to the differences in interactions with the stationary and mobile phases, individual components of a mixture will move down the column at different rates (partitioning), thereby allowing separation of a mixture into individual components. Typically, the eluent is collected at the bottom of the column in fractions corresponding to individual materials obtained from separation of the original mixture. Overall, the effectiveness of a chromatographic separation to provide a single component in pure form is dependent upon a number of factors including choice of stationary and mobile phases (solvent polarity, for example), partitioning coefficients for components in the original mixture, quantity of mixture to be subjected to the method at one time, and dimensions of the column in which the separation is performed, among others.

In the second strategy (Method B), the porphyrin macrocycle is constructed under milder reaction conditions which is facilitated by catalytic amounts of strong acid (trifluoroacetic acid (TFA), for example) or Lewis acid (boron trifluoride ($BF_3$), for example) in organic solvents at ambient conditions or only slightly elevated temperatures, and is usually performed under inert atmosphere (nitrogen). In many cases, an appropriate oxidizing agent (p-chloranil or similar) is added following condensation to facilitate porphyrin formation from the intermediate porphyrinogen species. In general, the milder reaction conditions are better tolerated by a wider range of starting materials, although certain functional groups still require appropriate (chemical) protection. Conveniently, elaborate porphyrin materials are more accessible due to the inherent synthetic flexibility of this approach. Although aldehydes and pyrroles may still function as the fundamental synthetic building blocks, dipyrrylmethanes, which represent a reaction product of one aldehyde with two pyrrole units, can be prepared and subsequently employed as a starting material for porphyrin formation. In this way, the amount of desired porphyrin product formed can be maximized (within statistical limits) while side-reactions are suppressed, at least to an extent. In addition to the synthesis of tetraphenylporphyrins, this strategy can be extended to the preparation of mono-, di-, and triphenylporphyrins, among others. In spite of these advantages, subsequent purification of the reaction mixture still requires chromatographic methods. In addition, the preparation of the dipyrrlmethane starting materials can prove difficult and requires analogous purification methods. Nevertheless, reaction yields for porphyrins synthesized through these methods can approach 50% in some cases. Subsequent deprotection of functional groups (if used as starting material for porphyrin formation) necessitates an additional synthetic chemistry step as well as further purification, often via column chromatography.

The chemistry outlined in the two preceding methods leads to the formation of an intact porphyrin macrocycle. More often than not (at this stage), the porphyrin product functions as a scaffolding upon which additional chemical functionalities are introduced through an array of available synthetic methodologies. Such modifications, which may include the introduction of additional functional groups along the porphyrin periphery and/or insertion of transition metals in the porphyrin core, necessarily require additional synthetic steps. Each subsequent modification of the porphyrin macrocycle requires chemical reaction(s) followed by a purification step, which in most cases involves column chromatography and/or recrystallization. In addition, many of these chemical reactions require highly controlled conditions (dry solvents, inert atmosphere, etc.) and/or extended reaction times (up to 48 hours or more) and are further complicated by the fact that conversion percentages (from porphyrin starting material(s) to desired porphyrin product) can vary from extremely low to moderate, while almost never furnishing a single porphyrin product. As a result of this, chromatographic separation of a mixture of porphyrin products or, at the very least, separation of desired porphyrin product from unreacted porphyrin starting material, is required. For these reasons, only modest amounts of final porphyrin material are most often obtained following a sequence of multiple synthetic steps.

As previously mentioned, the motivation to synthesize more elaborate porphyrin architectures is correlated with a desired function or performance. In simple cases, straightforward modifications are performed for the purposes of providing "attachment" to other molecules, substrates and/or other porphyrins including the introduction of carboxyl, sulfonate, or phosphonate groups for adsorption onto metal oxides (dye-sensitized solar cells, DSCs) or introduction of an aldehyde group, as is the case for constructing molecular electronic devices involving porphyrins and fullerenes or carbon nanotubes through the well-known Prato reaction.

Often, the desired enhancements accessible through chemical modification of porphyrins involve manipulation of light-harvesting properties and/or excited-state behaviors (electron transfer). For example, it is well-known that increasing the n-conjugation extending from the porphyrin core can lead to enhanced absorption properties which may include (1) increased absorptivity over a particular wavelength range, (2) a broadening of optical absorption over wider ranges and/or (3) shifting of absorption towards longer (or shorter) wavelengths. Not surprisingly, this can be accomplished through a number of synthetic approaches and may involve direct attachment of conjugated moieties to the porphyrin core, formation of larger, porphyrin-centered macrocyclic derivatives prepared through ring-fusion reactions, or linear (or branched) poly-porphyrin architectures through which networks (dimers, trimers, tetramers, oligomers, polymers) of porphyrin subunits are connected through various motifs. Most often, porphyrin dimers, trimers, and tetramers are constructed in a step-wise approach whereby single porphyrin units are sequentially added to the evolving tetramer. In these cases, the construction of the final porphyrin arrays involves: (1) synthesis of monomeric porphyrin subunits (or multiple subunits), (2) chemical reaction(s) to "link" two individual subunits, (3) purification of the new molecule and, finally, (4) a repeat of steps (1)-(3). Although precise control over subunit reactivity and overall configuration is possible, this approach is both challenging and time-consuming while often leading to only modest quantities of final porphyrin material. Nevertheless, elaborate porphyrin architectures can indeed been realized using these methodologies.

Figures 1A, 1B, 1C:
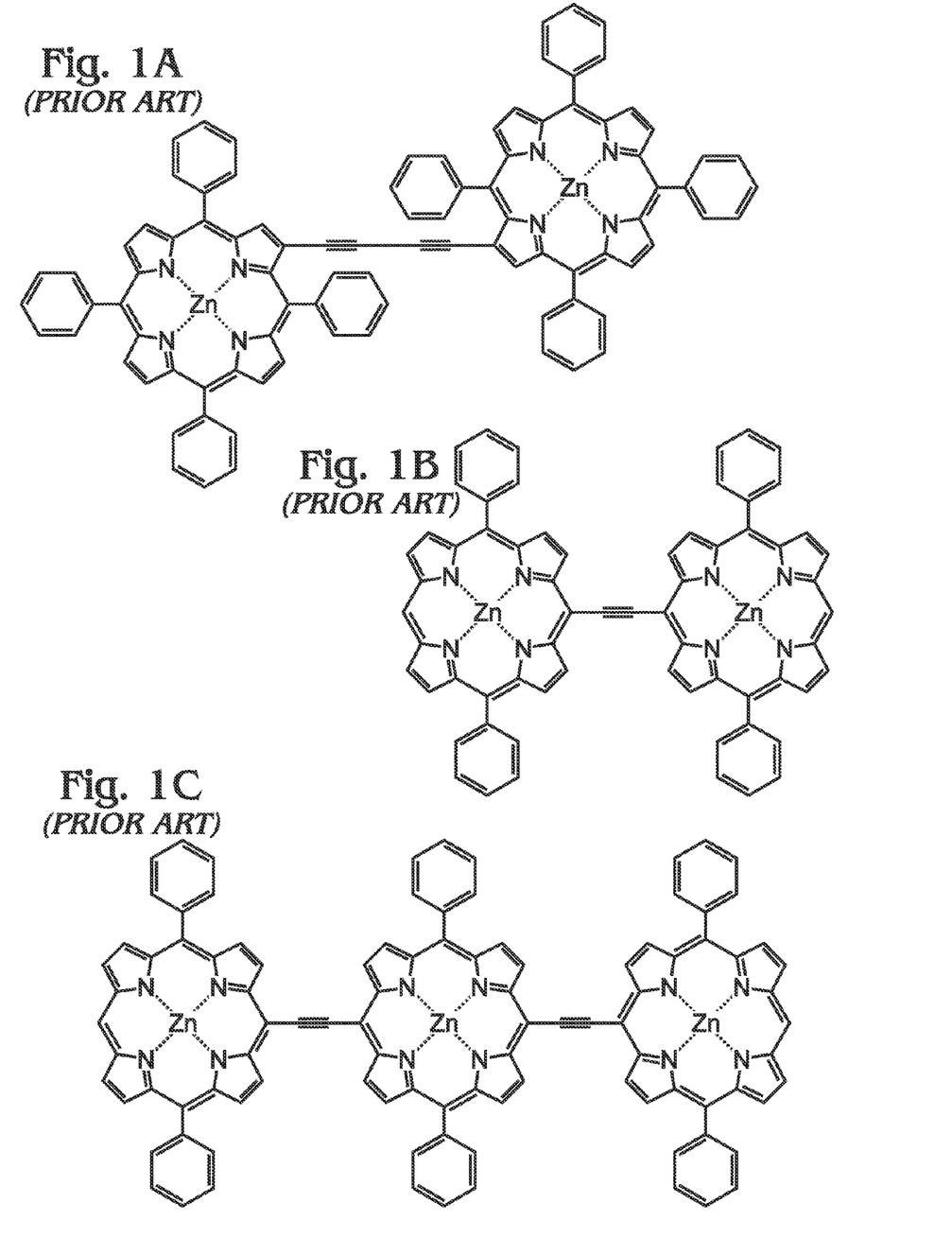
FIGS. 1A through 1C respectively depict the molecular structures of a β-zinc porphyrin dimer, meso-zinc porphyrin dimer, and meso-zinc porphyrin trimer (prior art).

FIGS. 1A through 1C respectively depict the molecular structures of a β-zinc porphyrin dimer, meso-zinc porphyrin dimer, and meso-zinc porphyrin trimer (prior art). Lin et al. described the synthesis and photophysical studies of conjugated acetylenic porphyrin arrays prepared through metal-mediated and/or organometallic coupling reactions of porphyrin monomers.[1] To summarize briefly, zinc porphyrins containing acetylene units attached to either the β- or meso-positions were synthesized from the appropriate zinc porphyrin starting materials under controlled conditions. The β- and meso-substituted zinc porphyrin monomers were used for the construction of a β-zinc porphyrin dimer, meso-zinc porphyrin dimer, and meso-zinc porphyrin trimer. Overall, the optical absorption properties of the dimeric (and trimeric) porphyrin arrays were dramatically altered with respect to the corresponding monomeric porphyrins.

Figure 2A:
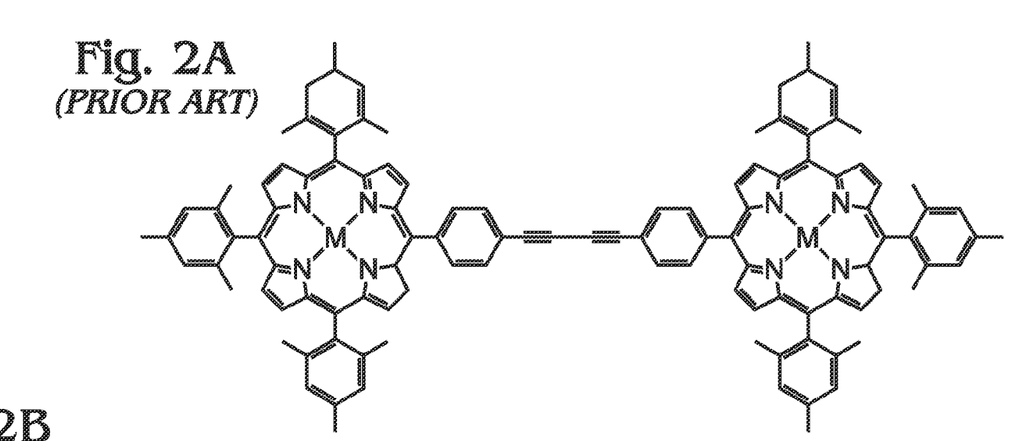
FIGS. 2A and 2B depict, respectively, the molecular structures of a phenylbutadiyne-linked zinc porphyrin dimer and phenylacetylene-linked zinc porphyrin trimer (prior art).
Figure 2B:
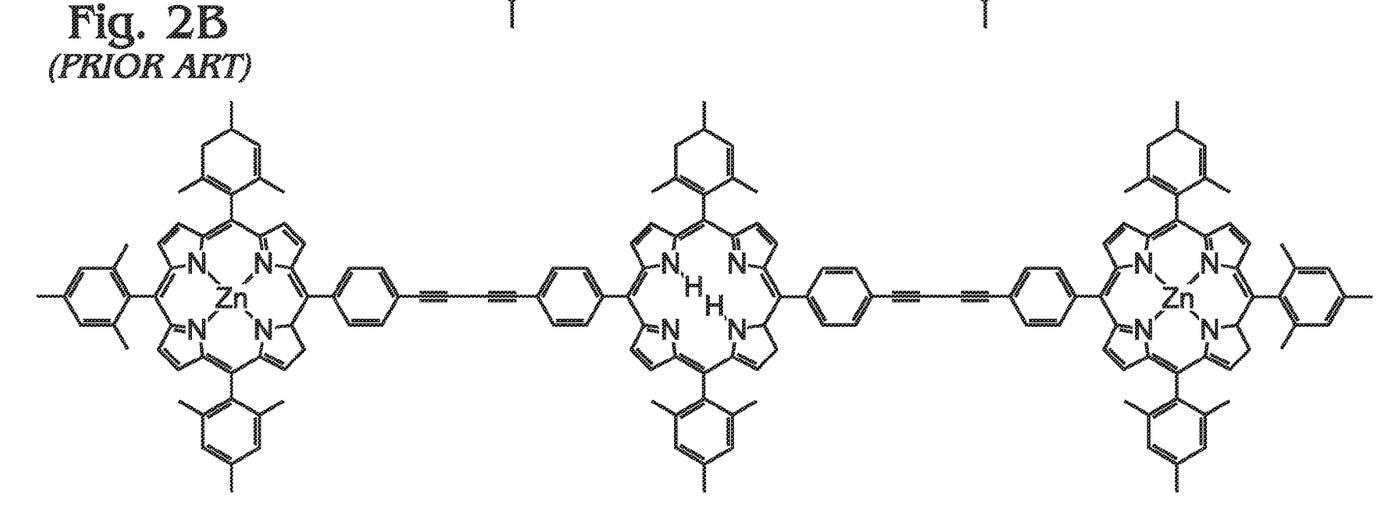

FIGS. 2A and 2B depict, respectively, the molecular structures of a phenylbutadiyne-linked zinc porphyrin dimer and phenylacetylene-linked zinc porphyrin trimer (prior art). Wagner et al. described the synthesis of phenylacetylene and phenylbutadiyne-linked porphyrin dimers and trimers using mild, copper-free conditions.[2] The dimers (or trimers) were formed in variable yields using either (1) a combination of two different synthetic porphyrins (for dimer) or (2) the reaction of one bi-functional porphyrin unit with two of the same porphyrins (for trimer). Not surprisingly, the distribution and overall yields of reaction products were highly variable and the complex mixtures of reaction products required subsequent purification and structural elucidation.

As an alternative to dimers, trimers, etc., large polymeric porphyrin architectures (linear or branched) are accessible using conventional synthetic methodologies with the appropriate monomeric porphyrins. Although polymeric porphyrins exhibit enhanced optical and electronic properties, overall solubility tends to be a limiting factor for practical application. In addition, the fabrication of porphyrin polymers often entails specialized equipment (electropolymerization) and/or glove-boxes/Schlenk lines (organometallic chemistry), highly-controlled chemical reaction conditions (chemical reaction stoichiometry, temperature) and, in many cases, extended periods of time. Nevertheless, the formation of extended networks (or polymers) of porphyrin-based "absorbers" is a promising strategy for fabricating both strongly and broadly absorbing materials.

Therein et al. described the preparation of highly-conjugated porphyrin arrays using metal-mediated cross-coupling reactions with metalloporphyrins.[3] The approach(es) involve porphyrin polymer formation using classical organometallic and/or oxidative coupling chemistry. The formation of both linear and branched poly-porphyrin architectures is indeed feasible using the approaches described although major drawbacks of the technology include: (1) the need to carefully synthesize and purify the appropriate porphyrin monomers, (2) critical control of reaction parameters (Schlenk line) in order for the necessary chemical reactions to be carried out in some cases, and (3) the requirement of heating under inert atmospheric conditions for extended periods of time.

In addition to synthetic methodologies described above, Chen et al. reported the synthesis of porphyrin-containing polymers linked through triazole rings prepared either by click polymerization with Cu(I) catalyst or heating to afford materials exhibiting relatively high molecular weight.[4] Overall, polymers obtained using the Cu(I)-catalyzed pathway provided lower molecular weights due to reduced rates for molecular weight growth compared to the metal free (thermal) polymerization. Overall, the polymers exhibited solubility in common organic solvents and demonstrated thermal stability up to 350° C. Conveniently, the method offers advantages in terms of reduced by-product formation as a result of the polymerization process. Jyothish et al. provided the preparation of a series of tris(arylmethyl)ammonium-coordinated molybdenum(VI) propylidyne catalysts that enabled the efficient synthesis of ethynylene-bridged porphyrin-based arylene ethynylene polymers through alkyne metathesis.[5] Xiang et al. described the synthesis of two conjugated polymers consisting of alternating main chain structures of zinc porphyrin-terthiophene (P-PTT) and zinc porphyrin-oligothiophene (P-POT).[6] The introduction of thiophene units in the meso-aryl positions of the porphyrin provided a bathochromic shift and broadened optical absorption characteristics relative to the monomeric zinc porphyrin (PZn) in both solution and thin solid film. Furthermore, electrochemical investigation indicated appropriate energy levels for efficient charge transfer and separation at the polymer (donor) and PCBM (acceptor) interface. Finally, bulk heterojunction (BHJ) solar cells based on P-PTT and PPOT demonstrated power conversion efficiencies (PCEs) up to 0.32% and 0.18%, respectively.

Shi et al. provided a donor-acceptor porphyrin-containing conjugated co-polymer (PCTTQP) that exhibited broad absorption along the visible spectrum.[7] Furthermore, corresponding BHJ solar cells based upon blends of PCTTQP and $PC_{71}BM$ demonstrated PCE=2.5%. Natori et al. reported the synthesis of a tetraphenylporphyrin ($H_2TPP$)-end-functionalized poly(p-phenylene) ($H_2TPP$-PPP) exhibiting a well-controlled polymer chain structure and broad absorption across the visible region.[8] Finally, Wirotius et al. described the fabrication of dendrimer-like star-branched poly(ethylene oxide)s (PEOs) comprising two and three generations with Zn(II) tetraphenylporphyrin (ZnTPP) moieties located at both the core and at each branching point through a convergent approach using "click chemistry".[9]

An alternative to chemical methods for the fabrication of porphyrin polymers involves direct electrochemical polymerization of the appropriate porphyrin subunits (monomers).[10-11] Giraudeau et al. demonstrated a convenient method for the electropolymerization of porphyrins that circumvents the difficulties involved in synthesizing a functional porphyrin monomer by directly employing a commercial zinc-β-octaethylporphyrin (ZnOEP) with 4,4'-bipyridine (bpy) in solution.[12]

Figure 3:
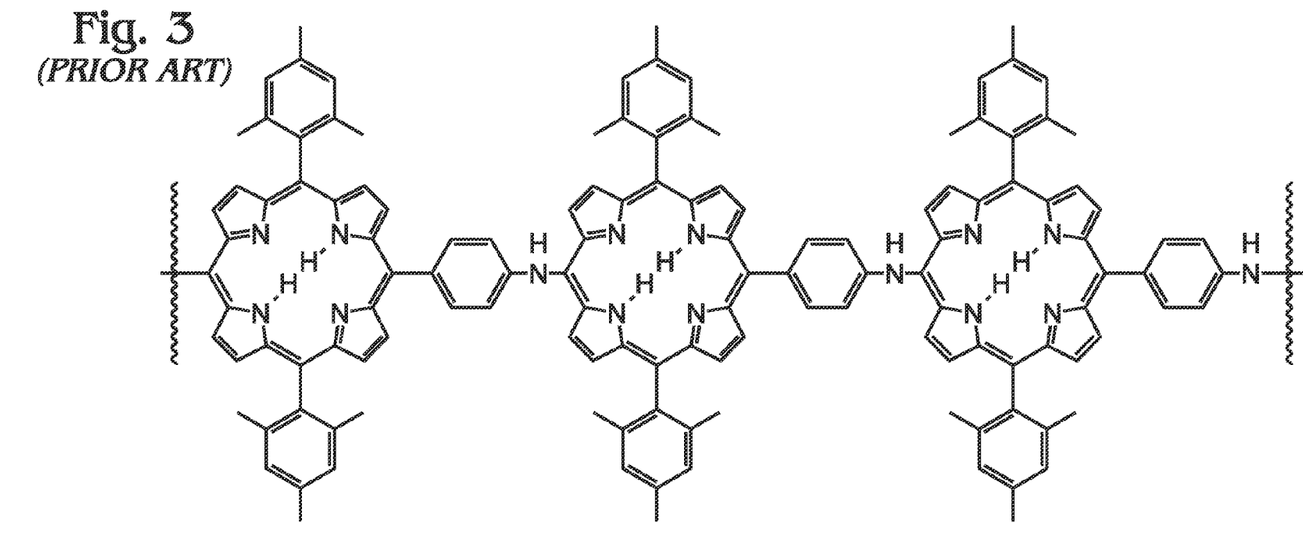
FIG. 3 depicts a structure of a porphyrin polymer prepared via electropolymerization of porphyrin monomers (prior art).

FIG. 3 depicts a structure of a porphyrin polymer prepared via electropolymerization of porphyrin monomers (prior art). Gust et al. reported the in situ electropolymerization of porphyrins and porphyrin-[60]fullerene dyads to form conjugated porphyrin-based materials on conductive electrodes.[13-14] With respect to the porphyrin moieties in the polymers, hole conductivity proceeds in ways analogous to conduction in polyaniline. In all cases, the porphyrin units are linked by aminophenyl groups to form a linear chain in which the porphyrins function as an integral part of the polymer backbone. In general, the absorption characteristics of the films resemble that of the corresponding porphyrin subunits, except for significant broadening of absorption peaks due to extended conjugation in the polymers. In this case, the insolubility of the polymerized porphyrin polymer is circumvented by an in situ electropolymerization process that deposits the polymer directly onto an electrode. Nevertheless, there exist some limitations with this technology which include: (1) the need to strategically synthesize the appropriate porphyrin monomer through several independent steps, and (2) the electropolymerization process proceeds only within a controlled environment.

Figure 4A:
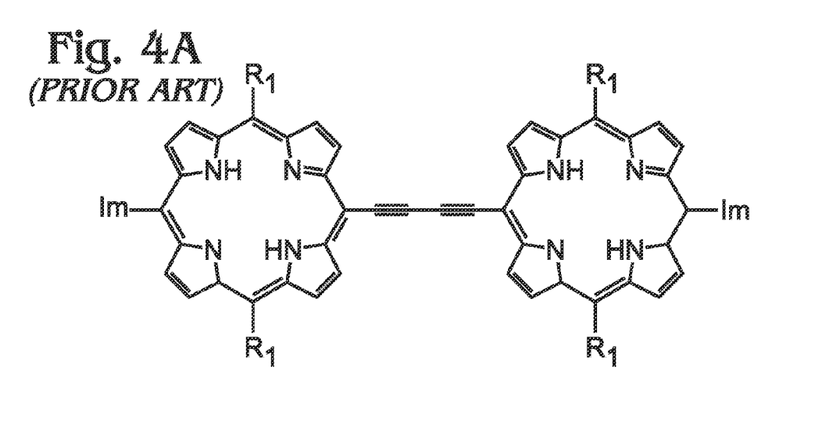
FIG. 4A through 4C respectively depict porphyrin dimers consisting of two free-base porphyrins, two zinc porphyrins, and one free-base porphyrin and one zinc porphyrin, whereby Im=imidazole (prior art).
Figure 4B:
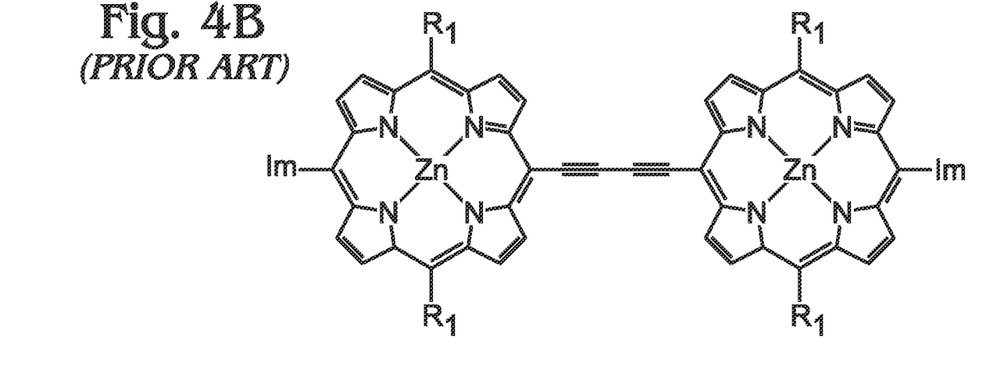
Figure 4C:
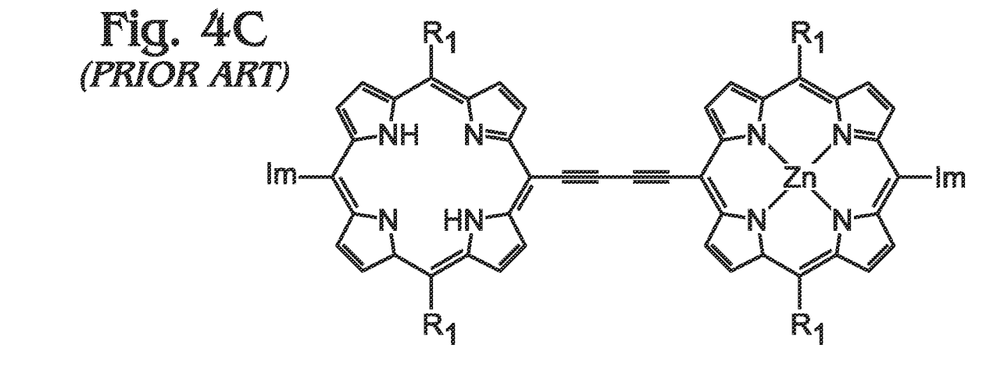

FIG. 4A through 4C respectively depict porphyrin dimers consisting of two free-base porphyrins, two zinc porphyrins, and one free-base porphyrin and one zinc porphyrin, whereby Im=imidazole (prior art). In contrast to chemical methods that furnish extended, covalently-bonded porphyrin networks, porphyrin polymers have been realized through effective "self-assembly" in solution. Michelsen et al. demonstrated the ability to control the self-assembly of polymers formed from cobalt porphyrins functionalized with two pyridine ligands.[15] Accordingly, high molecular masses (>100 kDa) could be realized for the polymer which could be modulated by adding monofunctional chain terminating moieties or by adjusting the concentration. Kobuke et al. described the design and synthesis of alkyne-linked, bis(imidazoyl)porphyrin complex (dimer) arrays that exhibited large, dual photon absorption characteristics.[16] The core technology consists of covalently linking two porphyrins bearing imidazole groups together (to form dimers) through an alkyne linker. The three possible combinations are as follows: (1) both porphyrins may be free-base (no metal), (2) both porphyrins may be metallated (zinc), or (3) one porphyrin may be free-base while the other porphyrin is metallated as indicated in FIGS. 4A-4C. As is common with zinc porphyrins, axial coordination readily occurs in the presence of amine groups possessing a free electron pair. Not surprisingly, enhanced redox behaviors are commonly observed upon axial coordination of various ligands to metalloporphyrins, although the phenomenon is sensitive to a number of factors that include the mode/strength of coordination, solvent properties, and concentration in addition to geometric considerations.

Although porphyrin polymers have significant relevance as absorber materials in PV applications, several reports describe the gas adsorption properties and catalytic activity of functional porphyrin networks, which are briefly summarized below. Wang et al. described the synthesis of four porous polymers consisting of nickel (Ni)-porphyrin units through which Brunauer-Emmet-Teller (BET) specific surface areas up to 1711 $m^2/g$ were achieved.[17] Modak et al. provided a synthesis of iron (Fe)-containing, porous organic polymers (POPs) through a one-pot, bottom-up approach.[18] Overall, the Fe-POPs exhibited both high BET surface area with large micropores and demonstrated excellent $CO_2$ capture. Finally, Shultz et al. demonstrated the synthesis of a POP containing free-base porphyrin subunits through condensation of a bis (phthalic acid)porphyrin with tetra(4-aminophenyl)methane.[19] Subsequent metallation provided microporous materials incorporating either Fe or manganese (Mn) porphyrins that demonstrated catalytic activity in both olefin epoxidation and alkane hydroxylation.

In spite of the novel technologies described herein, it would be advantageous to develop methodologies for (poly)porphyrin-based "absorber" materials which meet the following criteria:
  (1) Consist of porphyrin subunits (monomers) that can be strategically synthesized in a straightforward manner:
    a. Synthesis should be performed in a limited number of steps to furnish a functional, polymerizable porphyrin monomer without the use of expensive catalysts (palladium, for example) at any step in the synthesis.
    b. Purification following each synthetic step should be simplified (filtration as opposed to column chromatography).

c. Reaction yields (conversion of starting material(s) to product) should be maximized, preferably quantitative, for some (if not all) of the chemical reactions involved.
d. Synthesis should be performed without the need for controlled environments (moisture-free, oxygen-free, etc.) and should not require any special equipment.
e. Chemical reaction times for the synthesis of porphyrin monomers and polymers should be reasonably short overall and not require extended periods of heating.

(2) Porphyrin polymer should demonstrate enhanced optical properties (absorption, for example) relative to the monomer subunit(s).

(3) Porphyrin polymer should be amenable to appropriate processing. Due to insolubility concerns, the strategies and methods for enhancing the solubility should be compatible with the core process for fabricating the polymer.

1. V. S-Y. Lin, S. G. DiMagno and M. J. Therien, "Highly Conjugated, Acetylenyl Bridged Porphyrins: New Models for Light-Harvesting Antenna Systems", *Science* 1994, 264, 1105-1111.
2. R. W. Wagner, T. E. Johnson, F. Li and J. S. Lindsey, "Synthesis of Ethyne-Linked or Butadiyne-Linked Porphyrin Arrays Using Mild, Copper-Free, Pd-Mediated Coupling Reactions", *Journal of Organic Chemistry* 1995, 60, 5266-5273.
3. M. J. Therien and S. G. DiMagno, "Metal-Mediated Cross-Coupling with Ring-Metalated Porphyrins", U.S. Pat. No. 5,986,090, 1999.
4. H. Chen, J. Zeng, F. Deng, X. Luo, Z. Lei and H. Li, "Synthesis and Photophysical Properties of Porphyrin-Containing Polymers", *Journal of Polymer Research* 2012, 19:9880.
5. K. Jyothish, Q. Wang and W. Zhang, "Highly Active Multidentate Alkyne Metathesis Catalysts: Ligand-Activity Relationship and Their Applications in Efficient Synthesis of Porphyrin-Based Aryleneethynylene Polymers", *Advanced Synthesis & Catalysis* 2012, 354, 2073-2078.
6. N. Xiang, Y. Liu, W. Zhou, H. Huang, X. Guo, Z. Tan, B. Zhao, P. Shen and S. Tan, "Synthesis and Characterization of Porphyrin-Terthiophene and Oligothiophene n-Conjugated Copolymers for Polymer Solar Cells", *European Polymer Journal* 2010, 46, 1084-1092.
7. S. Shi, X. Wang, Y. Sun, S. Chen, X. Li, Y. Li and H. Wang "Porphyrin-Containing D-π-A Conjugated Polymer with Absorption Over the Entire Spectrum of Visible Light and Its Applications in Solar Cells", *Journal of Materials Chemistry* 2012, 22, 11006-11008.
8. I. Natori, S. Natori, A. Kanasashi, K. Tsuchiya and K. Ogino, "Synthesis of Porphyrin-End-Functionalized Poly (p-Phenylene) as a Leaf-Green-Colored Soluble Semiconducting Polymer: Control of π-π Interactions for Visible-Light Absorption", *Reactive and Functional Polymers* 2013, 73, 200-206.
9. A-L. Wirotius, E. Ibarboure, L. Scarpantonio, M. Schappacher, N. D. McClenaghan and A. Deffieux, "Hydrosoluble Dendritic Poly(ethylene oxide)s with Zinc Tetraphenylporphyrin Branching Points as Photosensitizers", *Polymer Chemistry* 2013, 4, 1903-1912.
10. L. Ruhlmann, A. Schulz, A. Giraudeau, C. Messerschmidt and J-H. Fuhrhop, "A Polycationic Zinc-5,15-Dichlorooctaethylporphyrinate-Viologen Wire", *Journal of the American Chemical Society* 1999, 121, 6664-6667.
11. J. Hao, A. Giraudeau, Z. Ping and L. Ruhlmann, "Supramolecular Assemblies Obtained by Large Counteranion Incorporation in a Well-Oriented Polycationic Copolymer", *Langmuir* 2008, 24, 1600-1603.
12. A. Giraudeau, D. Schaming, J. Hao, R. Farha, M. Goldmann and L. Ruhlmann, "A Simple Way for the Electropolymerization of Porphyrins", *Journal of Electroanalytical Chemistry* 2010, 638, 70-75.
13. P. A. Liddell, M. Gervaldo, J. W. Bridgewater, A. E. Keirstead, S. Lin; T. A. Moore, A. L. Moore and D. Gust, "Porphyrin-Based Hole Conducting Polymer", *Chemistry of Materials* 2008, 20, 135-142.
14. J. D. Gust, P. A. Liddell, M. A. Gervaldo, J. W. Bridgewater, B. J. Brennan; T. A. Moore and A. L. Moore, "Electrically Conducting Porphyrin and Porphyrin-Fullerene Electropolymers", US2010/0065123 A1, 2010.
15. U. Michelsen and C. A. Hunter, "Self-Assembled Porphyrin Polymers", *Angewandte Chemie International Edition* 2000, 39, 764-767.
16. Y. Kobuke and K. Ogawa, "Porphyrin Array Exhibiting Large Two Photon Absorption Property and Including, as Structural Unit, Bis(Imidazolylporphyrin Metal Complex) Linked with Acetylenic Bond and the Derivative Thereof, and Method of Producing the Same", U.S. Pat. No. 7,022,840 B2, 2006.
17. Z. Wang, S. Yuan, A. Mason, B. Reprogle, D-J. Liu and L. Yu, "Nanoporous Porphyrin Polymers for Gas Storage and Separation", *Macromolecules* 2012, 45, 7413-7419.
18. A. Modak, M. Nandi, J. Mondal and A. Bhaumik, "Porphyrin Based Porous Organic Polymers: Novel Synthetic Strategy and Exceptionally High $CO_2$ Adsorption Capacity", *Chemical Communications* 2012, 48, 248-250.
19. A. M. Shultz, O. K. Farha, J. T. Hupp and S. T. Nguyen, "Synthesis of Catalytically Active Porous Organic Polymers from Metalloporphyrin Building Blocks", *Chemical Science* 2011, 2, 686-689.

SUMMARY OF THE INVENTION

Described herein is a method for the synthesis of metalloporphyrin polymer materials, e.g., zinc porphyrin polymers, from metal (e.g. zinc) porphyrin (monomeric) subunits using a convenient methodology. The porphyrin polymer exhibits enhanced optical absorption characteristics relative to the individual porphyrin monomers and may function as a light-harvesting ("absorber") material. The synthetic process consists of just a few steps, all of which proceed without the need for purification methods beyond straightforward filtration and, optionally, solvent evaporation following chemical reaction. Although the synthetic step affording the lowest chemical conversion yield involves formation of the porphyrin macrocycle from aromatic aldehyde and pyrrole starting materials (reactants), the subsequent chemical reactions proceed with nearly 100% conversion yield of porphyrin starting material to synthesized porphyrin product. Furthermore, all chemical manipulations can be performed without the need for environmental control. Finally, the time required for any one of the chemical reaction steps to proceed is typically around 1 hour or less. Accordingly, the synthesis of a porphyrin polymer has been successfully demonstrated using the parameters described in detail herein. Subsequent optical characterization has confirmed the enhancement in optical absorption properties for the metalloporphyrin polymer.

Accordingly, a method is provided for synthesizing a metal (M) meso-tetraphenylporphyrin polymer. The method begins with the provision of a free-base ($H_2$)-meso-tetra-4-(trialkylsilyl)ethynylphenylporphyrin ($H_2$-tetra-C≡C-TriAS-TPP) including a trialkylsilyl (TriAS) moiety attached to an ethynyl termini. In response to a reaction with a metal (M)-containing material, the $H_2$-tetra-C≡C-TriAS-TPP is converted to a metal (M)-tetra-4-(trialkylsilyl)ethynylphenylporphyrin (M-tetra-C≡C-TriAS-TPP). Then, the M-tetra-C≡C-TriAS-TPP is converted to a M-tetra-4-ethynylphenylporphyrin (M-tetra-C≡C-TPP) monomer by removing the TriAS moiety from the ethynyl termini. Finally, a plurality of M-tetra-C≡C-TPP monomers are coupled to supply a metal (M)-meso-tetraphenylporphyrin polymer (M-poly-meso-TPP), whereby meso-phenyl groups of adjacent M-tetra-C≡C-TPP monomers in the M-poly-meso-TPP are connected through a butadiyne linking moiety. In one aspect, the metal is zinc.

Additional details of the above-described method and a metal (M) meso-tetraphenylporphyrin polymer are provided below.

DETAILED DESCRIPTION

Figure 5A:
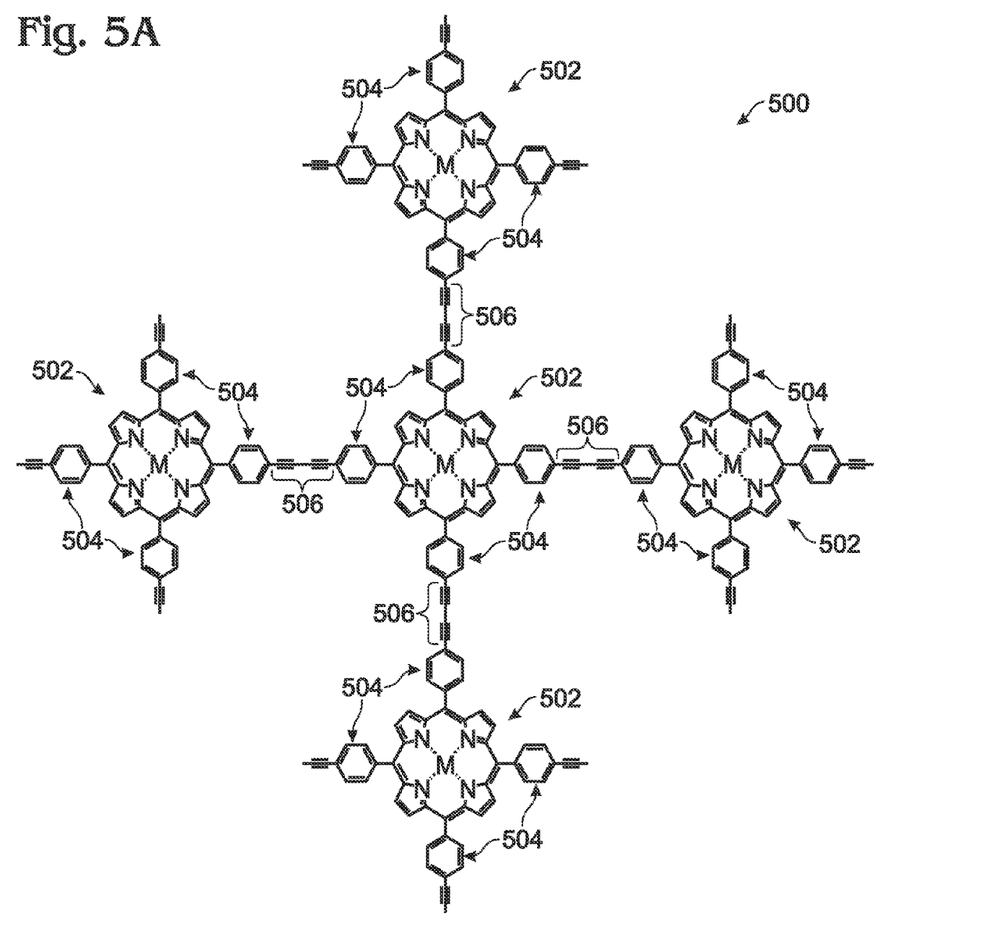
FIGS. 5A and 5B are diagrams of a metal (M) meso-tetraphenylporphyrin polymer (M-poly-meso-TPP).
Figure 5B:
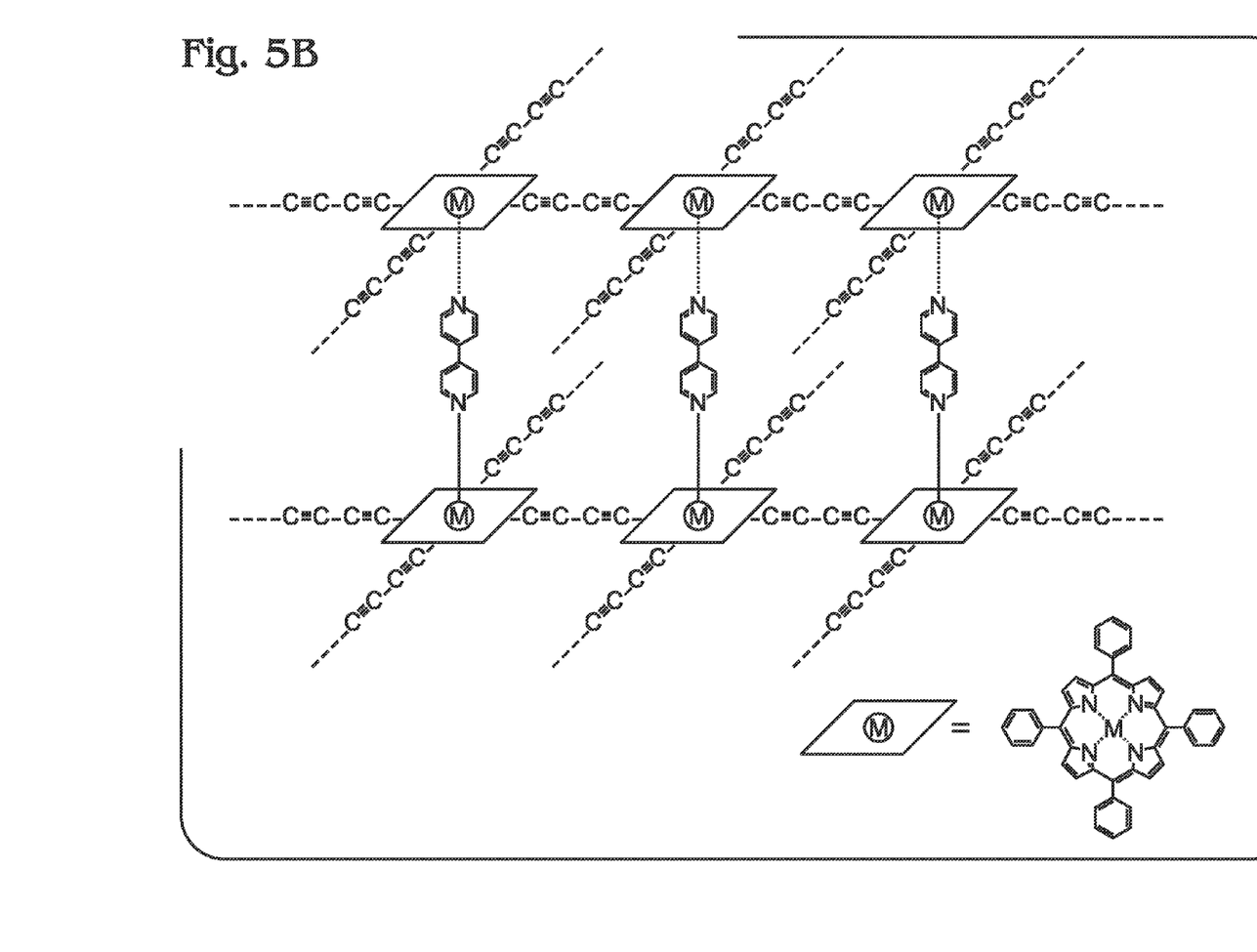

FIGS. 5A and 5B are diagrams of a metal (M) meso-tetraphenylporphyrin polymer (M-poly-meso-TPP). As shown in FIG. 5A, the M-poly-meso-TPP 500 comprises a plurality of M-tetra-C≡C-TPP (porphyrin) monomers 502 with meso-phenyl groups 504. Butadiyne (—C≡C—C≡C—) linking moieties 506 connect the meso-phenyl groups 504 of adjacent M-tetra-C≡C-TPP monomers 502. In one aspect, a bisamine-containing material coordinates with an M moiety of adjacent M-poly-meso-TPP polymer chains. As used herein, "bisamine coordination with the M moiety of adjacent polymer chains" refers to the coordination of a bisamine with the M group of two porphyrin monomer units. Due to axial coordination and the fact that the polymer exhibits a rigid conformation, by default these two monomers exist in different polymer chains, see FIG. 5B. As used herein, "ligand" is defined as an amine group containing species that coordinates with an M group of a M-containing porphyrin. As mentioned above in the Background Section, (axial) coordination with metalloporphyrins readily proceeds in the presence of amine groups possessing a free electron pair including materials that either are, or contain pyridine. In one aspect, the metal (M) is zinc (Zn). As used herein, a "monomer" is understood to be a single molecular unit or subunit that may covalently bond with other molecules (e.g. monomers) to form a polymer.

FIG. 5B depicts the coordination of metals in individual porphyrins comprising the M-porphyrin polymer chains with a bisamine (specifically 4,4'-bipyridine (Bipy)). For clarity, only a section of the polymer has been depicted, whereby (—C≡C—C≡C—) indicates a continuation of the polymer structure.

FIGS. 6A through 6D depict a sequence of synthetic steps for the synthesis of M-poly-meso-TPP. As a proof of concept, a zinc porphyrin polymer was synthesized starting from 4-[(trimethylsilyl)ethynyl]benzaldehyde and pyrrole (see FIG. 6A). In summary, the reagents and conditions of the steps are as follows: (FIG. 6A) propionic acid, heat, for 1 hour; (FIG. 6B) Zn(OAc)$_2$, chloroform (CHCl$_3$)/methanol (MeOH) (2:1), heat, for 1 hour; (FIG. 6C) excess tetrabutylammonium fluoride (TBAF), tetrahydrofuran (THF), 25° C., for 1 hour; and, (FIG. 6D) MeOH, pyridine, Cu(OAc)$_2$, heat, for 1 hour.

Experimental (Synthetic) Details

H$_2$-tetra-4-(trimethylsilyl)ethynylphenylporphyrin (H$_2$-tetra-C≡C-TMS-TPP)

Figure 6A:
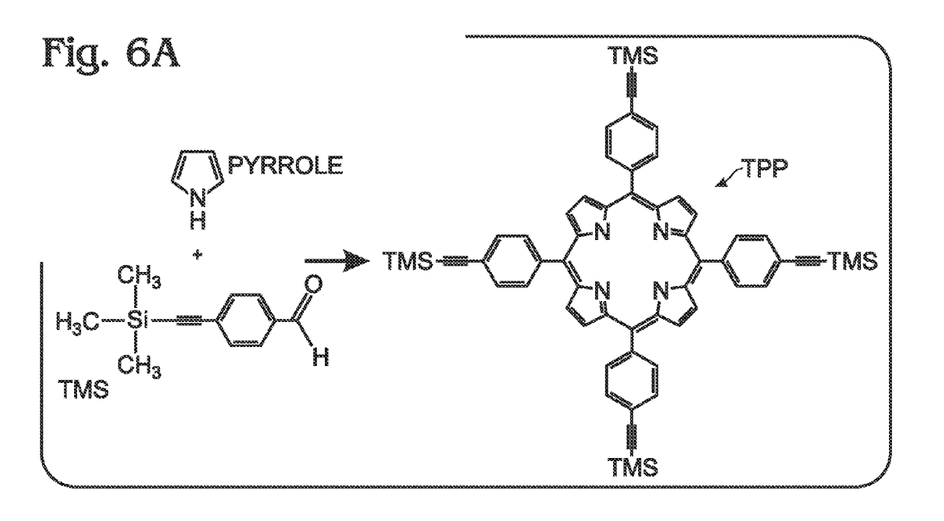
FIGS. 6A through 6D depict a sequence of synthetic steps for the synthesis of M-poly-meso-TPP.

Step 1, see FIG. 6A

To a solution of 4-[(Trimethylsilyl)ethynyl]benzaldehyde in propionic acid at reflux was added dropwise with vigorous stirring an equimolar amount of pyrrole. Following heating at ~140° C. for an additional 45 minutes, the reaction mixture was cooled, collected by filtration through a sintered glass funnel, and subsequently washed sequentially with cold MeOH and acetone.

Zinc-tetra-4-(trimethylsilyl)ethynylphenylporphyrin (Zn-tetra-C≡C-TMS-TPP)

Figures 6B, 6C:
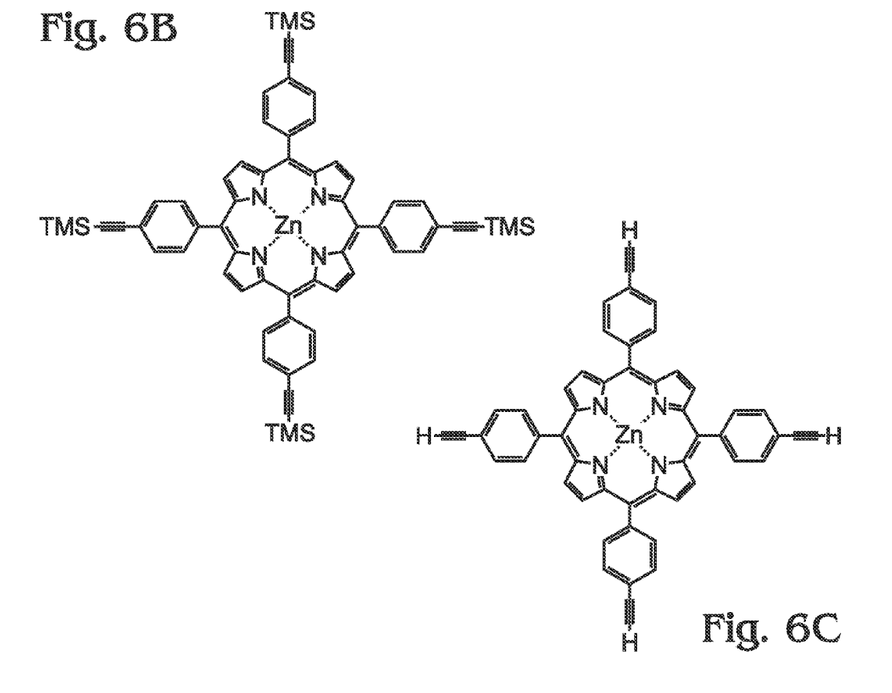

Step 2, FIG. 6B

To a solution of H$_2$-tetra-C≡C-TMS-TPP in CHCl$_3$/MeOH (2:1) was added a stoichiometric excess of zinc acetate. The reaction was heated at reflux for 1 hour, cooled, and the solvent removed by rotary evaporation under reduced pressure. The porphyrin was suspended in cold methanol, stirred, and collected by filtration through a sintered glass funnel. Preferably, an alternative to evaporation of solvent under reduced pressure following the reaction, the Zn-tetra-C≡C-TMS-TPP product can be directly precipitated in methanol and collected by filtration as described above.

Zinc-tetra-4-ethynylphenylporphyrin (Zn-tetra-C≡C-TPP)

Step 3, FIG. 6C

Quantitative deprotection of the trimethylsilyl (TMS) protecting groups of Zn-tetra-C≡C-TMS-TPP was accomplished by introducing a stoichiometric excess of TBAF at room temperature to a solution/suspension of Zn-tetra-C≡C-TMS-TPP in THF, followed by stirring for 1 hour. Following removal of solvent by rotary evaporation under reduced pressure, the porphyrin product was suspended in cold methanol, stirred, and collected by filtration through a sintered glass funnel to afford Zn-tetra-C≡C-TPP. Preferably, as an alternative to evaporation of solvent under reduced pressure following the reaction, the Zn-tetra-C≡C-TPP product can be directly precipitated in methanol and collected by filtration as described above.

Zinc Porphyrin Polymer (M-poly-meso-TPP)

Figure 6D:
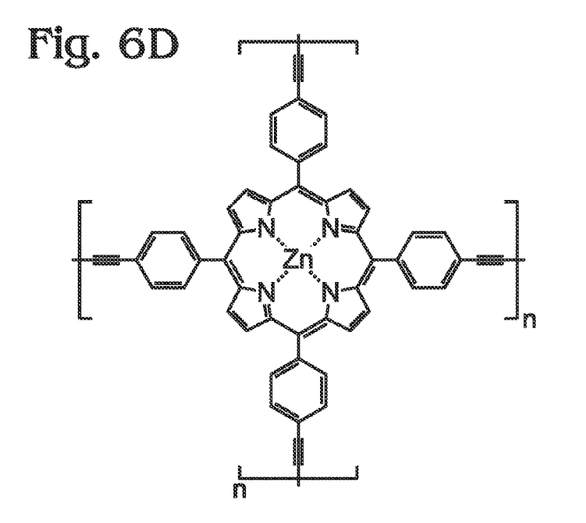

Step 4, FIG. 6D

A polymer comprising Zn-tetra-C≡C-TPP monomers was prepared using a copper-mediated reaction in pyridine/methanol at 25° C.→60° C. To a solution of Zn-tetra-C≡C-TPP in methanol/pyridine at 25° C. was added excess copper (II) acetate with vigorous stirring. The reaction mixture was heated and maintained at 60° C. for 1 hour, cooled, and collected by filtration using a sintered glass funnel. The polymer was washed sequentially with MeOH, water, and acetone, then collected by filtration.

Figure 7:
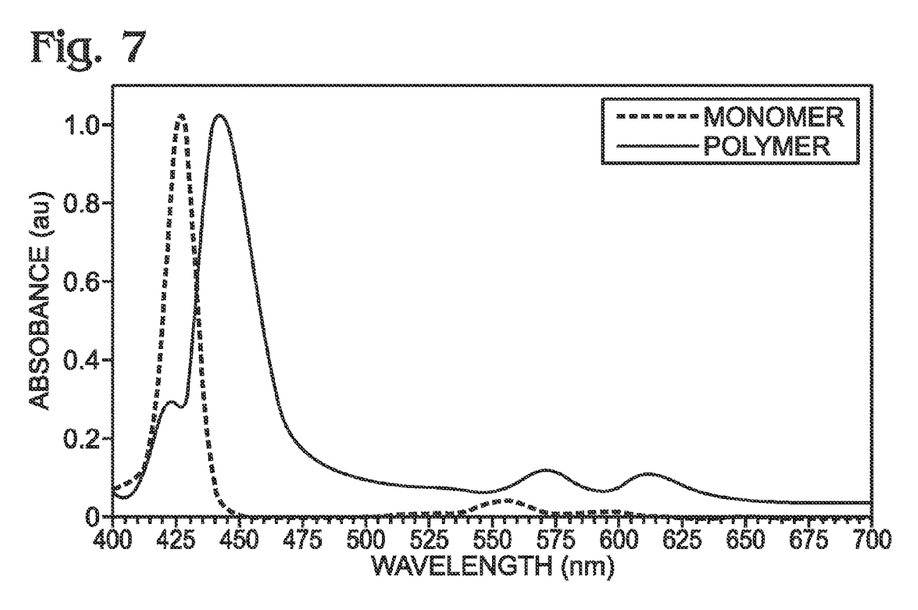
FIG. 7 is a graph depicting the optical absorption spectra for Zn-tetra-C≡C-TPP (monomer) and its corresponding zinc porphyrin polymer (Zn-poly-meso-TPP).

Optical Absorption Spectrum:

FIG. 7 is a graph depicting the optical absorption spectra for Zn-tetra-C≡C-TPP (monomer) and its corresponding zinc porphyrin polymer (Zn-poly-meso-TPP). The optical absorption spectra of Zn-tetra-C≡C-TPP (dotted line) and zinc porphyrin polymer in N,N-dimethylformamide (DMF)/pyridine (solid line) have both been normalized to ~1.0 for the porphyrin Soret band [y-axis: absorbance in arbitrary units (au); x-axis: wavelength in nanometers (nm)]. The absorption spectrum for Zn-tetra-C≡C-TPP is nearly identical to its TMS-protected zinc porphyrin precursor and is characterized by strong yet narrow absorption for the Soret band ($\lambda_{max}$=426 nm, sharp) and weak absorption for the lower energy Q-bands ($\lambda_{max}$=554 and 596 nm) bands. In contrast, the zinc porphyrin polymer exhibits strong, broad absorption for both the Soret ($\lambda_{max}$=442 nm) and Q-bands ($\lambda_{max}$=570 and 612 nm) with moderate absorption in the intermittent wavelength regions (475-550 nm).

Since the coordination of zinc porphyrins with ligands such as pyridine can often lead to optical and/or photophysical behaviors that differ from the pristine porphyrins, absorption spectra were obtained for monomeric Zn-tetra-C≡C-TPP in mixtures of DMF and pyridine. Since the absorption spectra for Zn-tetra-C≡C-TPP showed a bathochromic shift of less than 5 nm for both the Soret and Q-bands, the spectrum for the zinc porphyrin polymer presented in FIG. 7 accurately reflects a broadened, enhanced light-harvesting capability relative to Zn-tetra-C≡C-TPP (monomer).

Solubility (and Processability):

In addition to the synthetic methodologies described above for the synthesis of M-poly-meso-TPP, strategies for enhancing the solubility may include the following:

1. Incomplete deprotection of TMS protecting groups during synthesis of the Zn-tetra-C≡C-TPP monomer from Zn-tetra-C≡C-TMS-TPP. Since polymerization of the porphyrin monomer proceeds through the terminal ethyne (alkyne) groups, retention of some fraction of the TAS groups (or TMS groups in this example) imparts solubility to the porphyrin polymer as well as functions to decrease molecular weight of the as-formed polymer. At the same time, employing alternative TAS groups (triethylsilyl, tripropylsilyl, triisopropylsilyl, for example) provides a higher degree of solubility than TMS (trimethylsilyl) when used in this fashion. In all cases, incomplete deprotection can be achieved by employing a reduced stoichiometric quantity of reagent used to affect removal of the TMS (or TAS) groups.

2. Modulation of extent for chemical coupling (polymerization). The extent (or degree) of polymerization can be controlled by the ratio of catalyst (to monomer) used during the synthesis of M-poly-meso-TPP from Zn-tetra-C≡C-TPP (monomer). For example, decreased quantities of the Cu(II) catalyst may lead to lower molecular weight materials which exhibit better solubility.

3. Introduction of moieties possessing a single polymerizable terminus (alkyne) into the polymerization reaction. These chemical species may be functionalized with organic solubilizing groups (such as alkyl groups) to impart enhanced solubility in conventional solvents while the single polymerizable terminus serves as a polymer chain terminating group that modulates the molecular weight of the porphyrin polymer.

4. Employing 3,4 dialkyl functionalized pyrroles such as 3,4-dimethylpyrrole or 3,4-diethylpyrrole instead of pristine pyrrole in the first synthetic step.

Modification of Zinc Porphyrin Polymer Morphology:

Conveniently, the modification of the zinc porphyrin polymer can be accomplished via introduction of a bis-amine as ligand (for example, 1,4-diazabicyclo[2.2.2]octane (DABCO or Bipy which effectively coordinates two metalloporphyrin subunits in adjacent polymer chains, thereby restricting chain propagation to two dimensions.

Finally, although the porphyrin polymer described herein refers to a metalloporphyrin containing zinc, the processes are amenable to monomeric metalloporphyrins containing other metals or mixtures of monomeric metalloporphyrins containing various metals.

Figure 8:
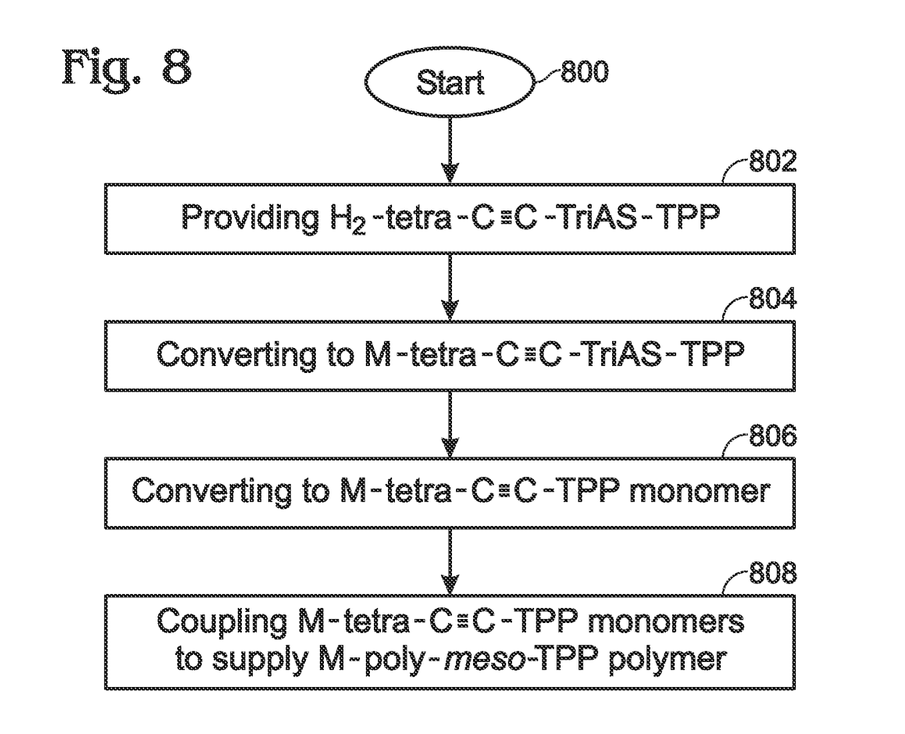
FIG. 8 is a flowchart illustrating a method for synthesizing a metal (M) meso-tetraphenylporphyrin polymer.

FIG. 8 is a flowchart illustrating a method for synthesizing a metal (M) meso-tetraphenylporphyrin polymer. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 800.

Step 802 provides a free-base ($H_2$)-meso-tetra-4-(trialkylsilyl)ethynylphenylporphyrin ($H_2$-tetra-C≡C-TriAS-TPP) including a trialkylsilyl (TriAS) moiety attached to an ethynyl termini. As is well understood, TMS (trimethyl)silyl is a member of the broader class of TAS (trialkyl)silyl species. TASs perform the same function as employed herein, which is as a chemical protecting group for terminal alkynes. Thus, although the term TMS has been used in this document as proof of concept, the function of TMS is considered to be equivalent to all TASs. Due to the appreciable chemical reactivity of terminal alkyne (ethyne) groups, appropriate chemical "protection" is employed to prevent the occurrence of undesired side reactions including acid catalyzed pathways and thermal polymerization, among other possibilities. In general, trialkylsilanes are employed due to (1) robust tolerance towards a diversity of chemical reagents and reaction conditions and (2) ease of removal in high conversion yield in a subsequent chemical reaction step. Although the identity of the alkyl group in the trialkylsilane is insignificant, a trimethylsilyl moiety was employed in the example. In response to a reaction with a metal (M)-containing material, Step 804 converts the $H_2$-tetra-C≡C-TriAS-TPP to a metal (M)-tetra-4-(trialkylsilyl)ethynylphenylporphyrin (M-tetra-C≡C-TriAS-TPP). In one example, the metal (M) is zinc (Zn). Step 806 converts the M-tetra-C≡C— TriAS-TPP to an M-tetra-4-ethynylphenylporphyrin (M-tetra-C≡C-TPP) monomer by removing the trialkylsilyl (TriAS) moiety from the ethynyl termini. Step 808 couples a plurality of M-tetra-C≡C-TPP monomers to supply a metal (M)-meso-tetraphenylporphyrin polymer (M-poly-meso-TPP), whereby meso-phenyl groups of adjacent M-tetra-C≡C-TPP monomers in the M-poly-meso-TPP are connected through a butadiyne linking moiety.

In one aspect, coupling the plurality of M-tetra-C≡C-TPP monomers to supply the M-poly-meso-TPP includes synthesizing the M-poly-meso-TPP from M-tetra-C≡C-TPP monomers in the presence of a Cu(II)-containing material and an amine (pyridine, for example). In one aspect, the Cu(II) containing material is copper(II) acetate. In another aspect, the amine is pyridine, a chemically functionalized pyridine, quinoline, or a chemically functionalized quinoline. In another aspect, the amine used during the polymerization of M-tetra-C≡C-TPP monomers remains coordinated to M-poly-meso-TPP following reaction and isolation. In another aspect, Step 808 synthesizes the M-poly-meso-TPP from M-tetra-C≡C-TPP monomers in the presence of a bisamine-containing material. For example, the bisamine-containing material may coordinate with an M moiety of adjacent M-poly-meso-TPP polymer chains, as shown in FIG. 5B. In one aspect, the bisamine-containing material may be 1,4-diazabicyclo[2.2.2]octane (DABCO) or 4,4'-bipyridyl (Bipy).

In one aspect, providing the $H_2$-tetra-C≡C-TriAS-TPP in Step 802 includes reacting a first material, such as pyrrole or an alkyl group functionalized pyrrole, with a 4-[(trialkylsilyl)ethynyl]benzaldehyde. For example, the 4-[(trialkylsilyl)ethynyl]benzaldehyde material may be 4-[(trimethylsilyl)ethynyl]benzaldehyde.

In another aspect, all the above-mentioned steps are performed using a solvent. Explicitly, Step 802 may synthesize the $H_2$-tetra-C≡C-TriAS-TPP using chemical reactions performed in a solvent. Step 804 may synthesize the M-tetra-C≡C-TriAS-TPP using chemical reactions performed in a solvent. Step 806 may synthesize the M-tetra-C≡C-TPP using chemical reactions performed in a solvent, and Step 808 may synthesize the M-poly-meso-TPP using chemical reactions performed in a solvent.

Further, all the above-mentioned steps may be performed in an ambient environment, without the requirement of a vacuum atmosphere, inert gases, or other environmental controls. Explicitly, Step 802 may synthesize the $H_2$-tetra-C≡C-TriAS-TPP in an ambient environment. Step 804 may synthesize the M-tetra-C≡C-TriAS-TPP in an ambient environment. Step 806 may synthesize the M-tetra-C≡C-TPP monomer in an ambient environment, and Step 808 may synthesize the M-poly-meso-TPP in an ambient environment.

In another aspect, all the above-mentioned steps may be performed without the requirement of chromatographic purification. Explicitly, Step 802 may sequester $H_2$-tetra-C≡C-TriAS-TPP from solvents and reaction components in response to filtering performed without using chromatographic purification. Step 804 may sequester M-tetra-C≡C-TriAS-TPP from solvents and reaction components in response to filtering performed without using chromatographic purification. Step 806 may sequester M-tetra-C≡C-TPP from solvents and reaction components in response to filtering performed without using chromatographic purification. Step 808 may sequester M-poly-meso-TPP from solvents and reaction components in response to filtering performed without using chromatographic purification.

An M-poly-meso-TPP and associated synthesis method have been provided. Examples of particular metals, reagents, and process variables have been presented to illustrate the invention. However, the invention is not limited to merely these examples. Other variations and embodiments of the invention will occur to those skilled in the art.

We claim:

1. A method for synthesizing a metal (M) meso-tetraphenylporphyrin polymer, the method comprising:
    providing a free-base ($H_2$)-meso-tetra-4-(trialkylsilyl)ethynylphenylporphyrin ($H_2$-tetra-C≡C-TriAS-TPP) including a trialkylsilyl (TriAS) moiety attached to an ethynyl termini;
    in response to a reaction with a metal (M)-containing material, converting the $H_2$-tetra-C≡C-TriAS-TPP to a metal (M)-tetra-4-(trialkylsilyl)ethynylphenylporphyrin (M-tetra-C≡C-TriAS-TPP);
    converting the M-tetra-C≡C-TriAS-TPP to a M-tetra-4-ethynylphenylporphyrin (M-tetra-C≡C-TPP) monomer by removing the trialkylsilyl (TriAS) moiety from the ethynyl termini; and,
    coupling a plurality of M-tetra-C≡C-TPP monomers to supply a metal (M)-meso-tetraphenylporphyrin polymer (M-poly-meso-TPP), whereby meso-phenyl groups of adjacent M-tetra-C≡C-TPP monomers in the M-poly-meso-TPP are connected through a butadiyne linking moiety.

2. The method of claim 1 wherein providing the $H_2$-tetra-C≡C-TriAS-TPP includes reacting a first material selected from a group consisting of pyrrole and an alkyl group functionalized pyrrole, with a 4-[(trialkylsilyl)ethynyl]benzaldehyde.

3. The method of claim 2 wherein reacting the first material with the 4-[(trialkylsilyl)ethynyl]benzaldehyde includes the 4-[(trialkylsilyl)ethynyl]benzaldehyde material being 4-[(triethylsilyl)ethynyl]benzaldehyde.

4. The method of claim 1 wherein converting the $H_2$-tetra-C≡C-TriAS-TPP to the M-tetra-C≡C-TriAS-TPP in response to the reaction with the M-containing material includes the metal (M) being zinc (Zn).

5. The method of claim 1 wherein providing the $H_2$-tetra-C≡C-TriAS-TPP includes synthesizing the $H_2$-tetra-C≡C-TriAS-TPP using chemical reactions performed in a solvent;
    wherein converting the $H_2$-tetra-C≡C-TriAS-TPP to the M-tetra-C≡C-TriAS-TPP includes synthesizing the M-tetra-C≡C-TriAS-TPP using chemical reactions performed in a solvent;
    wherein converting the M-tetra-C≡C-TriAS-TPP to the M-tetra-C≡C-TPP monomer includes synthesizing the M-tetra-C≡C-TPP monomer using chemical reactions performed in a solvent; and,
    wherein coupling the plurality of M-tetra-C≡C-TPP monomers to supply the M-poly-meso-TPP includes synthesizing the M-poly-meso-TPP using chemical reactions performed in a solvent.

6. The method of claim 5 wherein providing the $H_2$-tetra-C≡C-TriAS-TPP includes synthesizing the $H_2$-tetra-C≡C-TriAS-TPP in an ambient environment;
    wherein converting the $H_2$-tetra-C≡C-TriAS-TPP to the M-tetra-C≡C-TriAS-TPP includes synthesizing the M-tetra-C≡C-TriAS-TPP in an ambient environment;
    wherein converting the M-tetra-C≡C-TriAS-TPP to the M-tetra-C≡C-TPP monomer includes synthesizing the M-tetra-C≡C-TPP monomer in an ambient environment; and,
    wherein coupling the plurality of M-tetra-C≡C-TPP monomers to supply the M-poly-meso-TPP includes synthesizing the M-poly-meso-TPP in an ambient environment.

7. The method of claim 5 wherein providing the $H_2$-tetra-C≡C-TriAS-TPP includes sequestering $H_2$-tetra-C≡C-TriAS-TPP from solvents and reaction components in response to filtering performed without using chromatographic purification;
    wherein converting the $H_2$-tetra-C≡C-TriAS-TPP to the M-tetra-C≡C-TriAS-TPP includes sequestering M-tetra-C≡C-TriAS-TPP from solvents and reaction components in response to filtering performed without using chromatographic purification;

wherein converting the M-tetra-C≡C-TriAS-TRP to the M-tetra-C≡C-TPP monomer includes sequestering M-tetra-C≡C-TPP monomer from solvents and reaction components in response to filtering performed without using chromatographic purification; and, wherein coupling the plurality of M-tetra-C≡C-TPP monomers to supply the M-poly-meso-TPP includes sequestering M-poly-meso-TPP from solvents and reaction components in response to filtering performed without using chromatographic purification.

8. The method of claim 5 wherein coupling the plurality of M-tetra-C≡C-TPP monomers to supply the M-poly-meso-TPP includes synthesizing the M-poly-meso-TPP from M-tetra-C≡C-TPP monomers in the presence of a Cu(II)-containing material and an amine.

9. The method of claim 8 wherein coupling the plurality of M-tetra-C≡C-TRP monomers to supply the M-poly-meso-TPP includes synthesizing the M-poly-meso-TPP from M-tetra-C≡C-TPP monomers in the presence of a bisamine-containing material.

10. The method of claim 9 wherein the bisamine-containing material coordinates with an M moiety of adjacent M-poly-meso-TPP polymer chains.

\* \* \* \* \*